United States Patent [19]

Zaccagnino, Jr.

[11] 3,951,251

[45] Apr. 20, 1976

[54] DOCUMENT POSITIONING MEANS FOR PRINTING APPARATUS

[75] Inventor: Nicholas V. Zaccagnino, Jr., Stamford, Conn.

[73] Assignee: Bunker Ramo Corporation, Oak Brook, Ill.

[22] Filed: July 31, 1974

[21] Appl. No.: 493,399

[52] U.S. Cl. .......... 197/127 R; 101/233; 197/1 R; 235/61.12 M; 283/57; 360/121

[51] Int. Cl.[2] .......... B41J 13/00; G06K 19/06

[58] Field of Search .......... 197/1 R, 19, 127 R, 197/DIG. 9; 360/121; 235/61.12 M; 283/6, 57, 63 R, 63 A, 64, 66 R, 66 A

[56] References Cited

UNITED STATES PATENTS

| | | | |
|---|---|---|---|
| 2,928,079 | 3/1960 | McNutt | 360/121 X |
| 2,936,870 | 5/1960 | Schmidt | 197/127 R |
| 2,961,645 | 11/1960 | Dickinson | 360/121 |
| 2,963,690 | 12/1960 | Holman | 360/121 |
| 3,040,860 | 6/1962 | Montross et al. | 197/127 R |
| 3,353,168 | 11/1967 | Poumakis | 360/121 |
| 3,508,032 | 4/1970 | MacDuffee et al. | 197/127 R X |
| 3,553,649 | 1/1971 | Madge et al. | 197/127 R X |
| 3,662,122 | 5/1972 | Grundtner et al. | 360/121 |
| 3,668,669 | 6/1972 | Marino et al. | 360/121 |
| 3,753,255 | 8/1973 | Di Veto | 235/61.12 M X |
| 3,756,365 | 9/1973 | Markakis | 197/19 X |
| 3,780,264 | 12/1973 | Kondur et al. | 235/61.12 M X |
| 3,823,405 | 7/1974 | Andreaggi et al. | 235/61.12 M X |

FOREIGN PATENTS OR APPLICATIONS

| | | | |
|---|---|---|---|
| 1,163,857 | 2/1964 | Germany | 197/DIG. 9 |

*Primary Examiner*—Edgar S. Burr
*Assistant Examiner*—Paul T. Sewell
*Attorney, Agent, or Firm*—F. M. Arbuckle

[57] ABSTRACT

A document positioning device is provided having a document holder or carrier which is driven by a stepper motor to position a document clamped therein for printing thereon. A row of light sources, e.g. light emitting diodes (LEDs) are pre-positioned and spaced along the path of travel of the document holder so that each source corresponds to a line to be printed on the document. A photosensor is mounted on the document holder for scanning the LEDs. The LED is lit for the selected line to be printed and the stepper motor moves the document holder, scanning the LEDs until coincidence occurs, stopping the motor. A memory is coupled to the motor control circuit of the stepper motor which is activated on coincidence to force the motor control circuit into the proper outputfor aselected line. For manualoperationthe LEDs are continually cycled, and the document holder manually moved to the selected line with the power to the motor off. On the selected line standby power is provided, producing an electrical detent action on each line, with the memory insuring the proper position. The positioning device may be actuated by line information contained on a magnetic stripe on the document which is read by a magnetic read/write head assembly. To facilitate the interchanging of documents in different printing apparatus, the write gap is considerably larger than the read gap in the magnetic read/write head.

14 Claims, 11 Drawing Figures

DOCUMENT POSITIONING MEANS FOR PRINTING APPARATUS

BACKGROUND OF THE INVENTION

This invention relates to a document positioning device for printing apparatus, and more particularly to such a device utilizing photoelectric means for selecting and controlling the lines on the document to be printed.

In an application Ser. No. 433,096 filed Jan. 14, 1974 now U.S. Pat. No. 3,912,068 (continuation of Ser. No. 249,856 filed May 3, 1972, now abandoned) entitled "Printer Having Document Thickness Compensation Device," by O. Kwan, J. J. Boyce and W. A. Ottersen, which is assigned to the assignee of the present invention, there is described printing apparatus which may be used in a bank teller terminal for performing printing operations on a document such as a bank passbook. The document is inserted in a document holder in the printing apparatus and the teller or operator either manually moves the holder with the document positioned therein to the desired printing position or by key operation actuates a document holder transport means to move the document into the desired print position. In order to operate the document holder automatically, an accurate step pulse count is required to accurately position the mechanism using a stepping motor. Furthermore, loss of power, system noise, etc. could cause the stepping motor to misstep, thereby mispositioning the document. Then, too, in automatic operation there is no assurance or confirmation that the positioning to a selected line has been achieved.

Accordingly, it is an object of this invention to provide a new and improved document positioning device for a positioning of a document in a printing apparatus which is simple and accurate.

Another object of this invention is to provide a novel document positioning device which is relatively immune from dispositioning due to system noise and does not require an accurate step pulse count.

A further object of this invention is to provide a new and novel document positioning device which has both a coarse and vernier position control to insure accurate positioning for each line on a document which is to be printed.

Another object of this invention is to provide a novel document positioning means which can be operated in response to information recorded on the document and read by the printing apparatus.

A still further object of this invention is to provide a document positioning means which can be positioned manually while providing an electrical detent action on such operation.

SUMMARY OF THE INVENTION

In carrying out this invention in one illustrative embodiment thereof, a document positioning means is provided in which a document holder carrying a document to be printed upon is moved by a stepper motor. A plurality of light sources, one for each line on the document, are arranged in a column and adapted to be scanned by a photodetector mounted on the document holder. The holder is driven by the stepper motor under control of a motor control circuit until coincidence occurs between the holder and a lighted source corresponding to a selected line which stops the motor. A memory is coupled to the motor control circuit which is activated on coincidence to force the motor control circuit into the proper output for the selected line. For manual operation the light sources are continually cycled and the document holder assembly manually moved to a desired line while the power to the motor is off. On coincidence, standby power is provided to produce an electrical detent action on each line. In another aspect of the invention, the document positioning device may be incorporated in a printing system in which the document to be printed on has a magnetic stripe positioned thereon which is read by a magnetic read/write head assembly. The positioning device may be controlled automatically by the information recorded and/or read from the magnetic stripe. To facilitate the interchanging of documents in different printing apparatuses, the write gap is larger than the read gap on the magnetic read/write head.

The aforesaid and other objects, features, and advantages of the invention will be apparent from the following description of the preferred embodiments of the invention as illustrated in the accompanying drawing.

DESCRIPTION OF THE PREFERRED EMBODIMENTS

Figure 1:
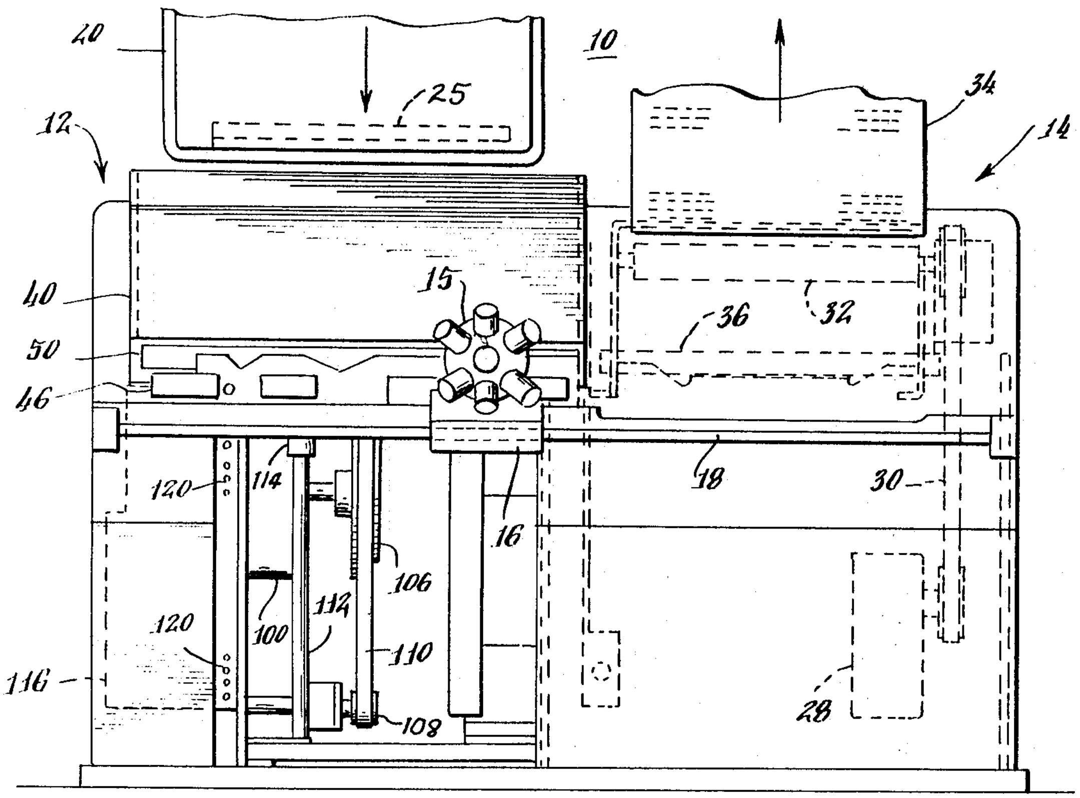
FIG. 1 is a front elevational view of a bank printer apparatus which incorporates embodiments of the present invention.

For purposes of the present disclosure, the various aspects of the present invention will be described in connection with a bank teller terminal in which the document to be printed upon is a bank passbook. It should be understood that the invention is not considered limited to the specific use chosen for purposes of illustration. In the disclosure that follows, like elements will bear like reference numerals.

Referring now to FIG. 1, a bank teller terminal is provided having the general reference numeral 10. The bank teller terminal 10 includes a document-printing station 12 and a journal-printing station 14. The bank teller terminal 10 illustrated in FIG. 1 is simplified for ease of illustration and description, and does not show a display device, such as a cathode ray tube, and a keyboard which is used by the teller to control the operation of various aspects of the bank teller terminal 10 and to provide instructions for a processor or computer to which the bank teller terminal 10 is connected, which stores account and other information which is to be stored and printed.

The document to be printed on is illustrated as a bank passbook 20, and is inserted into a document guide means or document chute 40 and directed into a document holder or carrier 46 at the document print station 12. As will be explained hereinafter, the document 20 is clamped in the holder 46, and a platen 50 is actuated to flatten out and back the document 20 for printing. The journal printing station 14 includes a roll of journal paper 34 which is driven by a motor 28 through a belt drive 30 to roller 32 to provide a paper advance for the journal paper 34. A platen 36 in line with the platen 50 of the document printing station 12 is activated when a printing operation is to take place. A matrix print head 15 is mounted on a carriage 16, which is positioned for movement on a guide rail 18 and driven by a motor (not shown see application Ser. NO. 433,096). When the document 20 is inserted in the document guide means 40 and positioned in the document holder 46, and moved to the line on the document 20 on which it is to be printed, which will be explained in detail hereinafter, the print head 15 moves across the document 20, printing on the document 20, backed by the platen 50, and duplicates the same printing on the journal 34 backed by the platen 36. The journal 34 provides a record of everything that is printed in the document printing station 12. Since all of the features of the present invention relate to the document printing station 12, a detailed description of the document printing station 12 follows.

Figure 2:
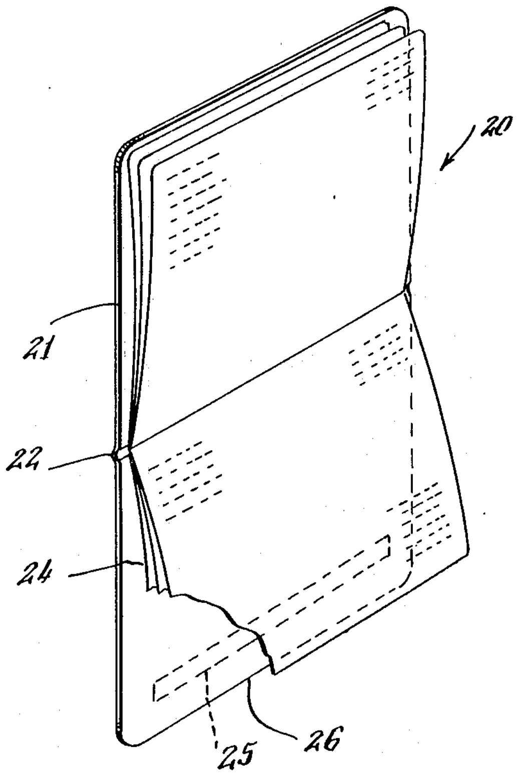
FIG. 2 is an isometric view of a bank passbook having a magnetic strip positioned thereon in accordance with the present invention which may be inserted and printed upon by the apparatus of FIG. 1.

In accordance with one feature of the present invention, the bank teller terminal 10 is provided with a magnetic capability in which the document 20 is provided with a magnetic stripe or patch 25, and a magnetic scanner (read/write) assembly referred to generally with the reference numeral 71 is provided to read and update information on the magnetic patch 25 on the document. As will be seen in FIG. 2, a passbook 20 having a cover 21, a centerfold 22, and a plurality of pages 24 fixed to the centerfold 22, is provided with a magnetic stripe or patch 25. The magnetic patch 25 must be affixed and positioned accurately on the passbook 20 in order to be inserted and cooperate with the document printing station 12 so that information on the patch 25 can be extracted or written thereon in an accurate, positive manner. The magnetic patch 25 is an adhesive backed polyester film patch having a magnetic (oxide) coating which is attached onto the cover 21 of the passbook 20, or for other applications similar to such documents. Magnetic patch 25 is positioned parallel to the centerfold 22, and also parallel to the unbound edge 26 which is nearest the last line to be printed upon the passbook 20. The patch 25 must be also located far enough from the unbound edge 26 such that the platen 50, when activated, clamps the passbook 20 with the patch 25 positioned and aligned above the platen 50. The platen 50 then, in effect, smooths out the passbook magnetic strip 25, facilitating the reading and writing thereon by the magnetic scanner assembly 71.

Figure 6:
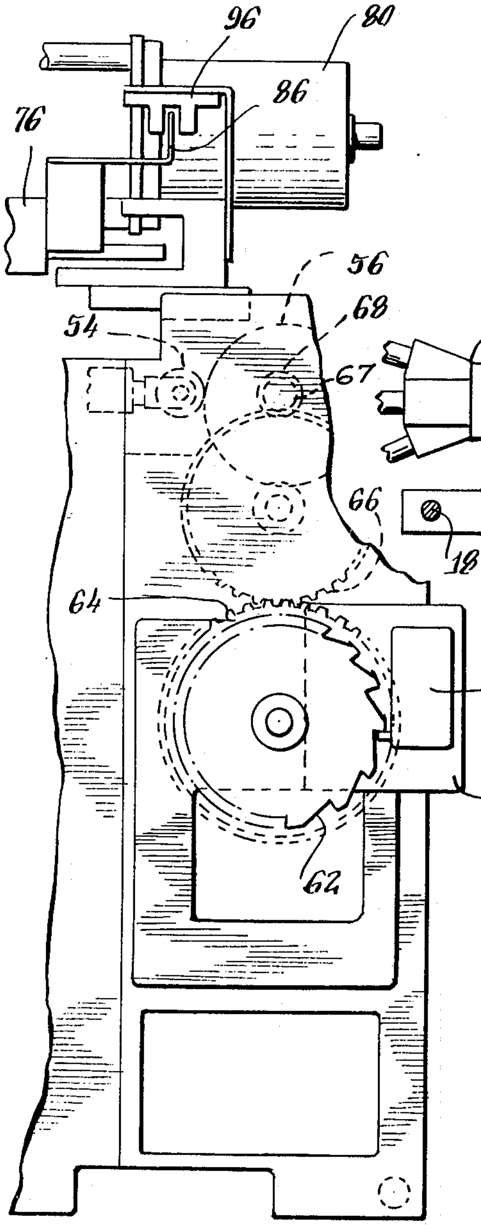
FIG. 6 is a partial side elevational view of FIG. 3.

When the passbook 20 is inserted in the document guide means 40 of the document printer station 12, the magnetic stripe 25 of the passbook 20 faces the back of the guide means 40 with the passbook 20 being open to the page on which printing is to take place, the page facing the teller or operator of the bank teller terminal 10. The passbook 20 is inserted through the guide means 40 until it reaches the bottom of the passbook holder 46, which is somewhat U-shaped, as best seen in FIG. 5. When the passbook 20 is inserted into the passbook holder 46, the passbook holder 46 is positioned in a home position which is designed to facilitate the reading of the magnetic stripe 25 which will be explained shortly. On being positioned in the document holder 46, the passbook interrupts a photodetector (not shown; see Pat. No. 3,912,068), which activates a solenoid clamp 55 having a spring-biased plunger (more clearly shown in Ser. No. 433,096) which clamps the passbook 20 in the U-shaped slot of the passbook holder 46. The solenoid clamp 55 functions to hold the document 20 in the passbook holder 46 as the document 20 is moved and positioned for a printing operation on a given line. FIG. 5 illustrates the solenoid clamp 55 in the home position, and in phantom in another position where a printing operation is to take place on the document 20. This document clamping device, as well as a document-thickness compensation mechanism to be briefly described hereinafter, is disclosed in the aforesaid patent Pat. No. 3,912,068. The document-thickness compensation mechanism is best shown on FIGS. 4 and 6. First, in FIG. 6, the mechanism is driven by a motor 60 which drives a switch cam 62 and a gear 64. The switch cam 62 operates a microswitch 65 for controlling the operation of the motor 60. Gear 64 drives a gear 66 which in turn drives a smaller gear 68, which drives a shaft 67 on which cam 56 is mounted. The rotation of the cam 56 is followed by a cam-follower 54, which operates a spring-loaded plunger 52 attached to the platen 50 (see FIG. 4). When the cam 56 is moved in a high dwell position by the motor 60 driven through the series of gears 64, 66 and 68, the platen 50 is driven forward by the action of the cam follower 54 on the spring-loaded plungers 52, clamping the platen 50 firmly against the document 20, which in the present invention serves a dual purpose. First, with the passbook 20 positioned in the holder 46, the system is designed such that the platen 50 contacts the passbook 20 parallel to and below the magnetic patch 25, straightening it so that the patch 25, if bent, is smoothed out to facilitate reading and writing thereon. In subsequent operations, of course, the platen 50 contacts the passbook 20, and the print head 15 produces a printing operation on the passbook 20, with the platen 50 backing the passbook 20. The platen 50 also smooths out the passbook 20 on which the printing operations are to be performed. Although not illustrated in the present drawing, the document guide means 40 may include a pair of elongated bars spaced to provide an opening therebetween for the passage of the print head 15, with the bars in combination with the platen 50 flattening the document 20 and establishing a print plane for the printer 15. This feature is shown and described in the aforesaid U.S. Pat. No. 3,912,068.

Figures 3, 4:
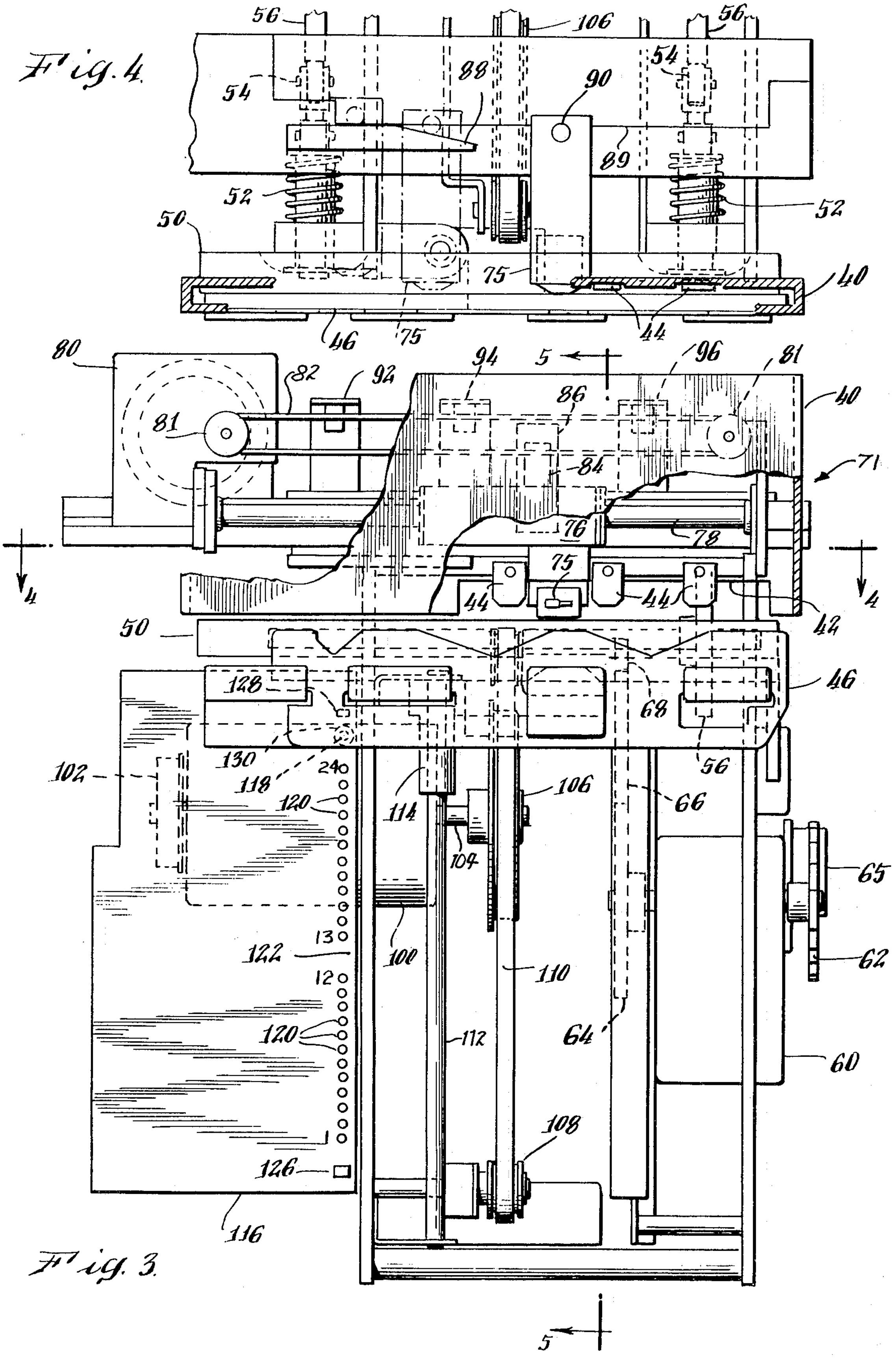
FIG. 3 is a front elevational view, partly broken and enlarged, illustrating in greater detail the passbook printing station of the printing apparatus of FIG. 1.
FIG. 4 is a cross-sectional view taken along line 4—4 of FIG. 3 which illustrates the movement of the magnetic scanner used in the present invention, and illustrates the structure of the document thickness compensating mechanism employed.
Figure 5:
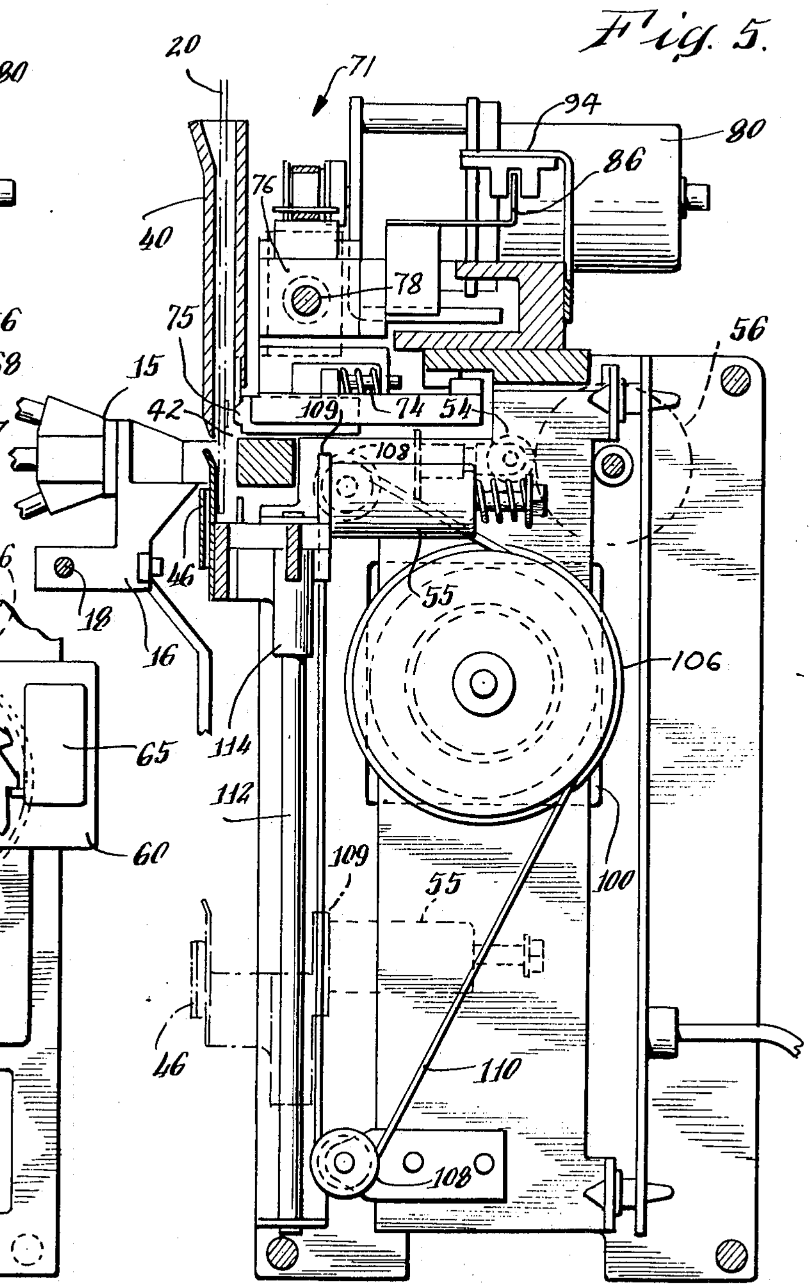
FIG. 5 is a cross-sectional view taken along line 5—5 of FIG. 3.

The magnetic scanner assembly 71 will best be seen in FIGS. 3–5. A magnetic read/write head 75 is mounted on a magnetic head carriage 76 and is spring loaded to the carriage 76 by a spring-loading mechanism 74. The spring-loading mechanism 74 accommodates surface variations in the magnetic stripe or patch 25. The surface variations in the magnetic patch 25 may result from wrinkling or otherwise bending the passboook 20, which in turn deforms the magnetic stripe 25. With the spring-loaded magnetic head 75, any variations resulting from use in handling of the passbook 20 can be accommodated by the magnetic head 75. A carriage guide rail 78 is provided on which the carriage 76 moves. The carriage 76 is driven by a motor 80 which drives rollers 81, having a belt 82 thereon which is coupled to the carriage 76 by element 84. The carriage 76 moves along the carriage guide rail 78 in a horizontal direction. Head 75 is also free to move in an orthogonal direction with respect to the carriage 76 as is best shown in FIG. 4. Magnetic head 75 is provided with a cam follower 90 which moves on a ramp cam surface 88 and a level surface 89. Accordingly, as the carriage 76 moves from left to right, as shown in FIG. 3, the magnetic head 75 moves down the ramp cam surface 88 to position the magnetic head 75 in position to read the patch 25 on the passbook 20. As the magnetic head 75 moves back, it is retracted when the cam follower 90 comes into contact with the ramp cam surface 88 which moves the magnetic head 75 away from the passbook 20. Three photocells, e.g. an LED light coupled interrupter such as GE Model H 13 Bl, numbered 92, 94 and 96 and best seen in FIG. 3, are spaced along the path of travel of the magnetic head 75 and are utilized to determine three positions of the magnetic head 75, which are a beginning-of-stripe position, a head-in contact position, and an end-of-stripe position, respectively. Interrupter element 86 which is attached to the carriage 76 interrupts the photocell 96 in a manner best seen in FIGS. 5 and 6, which sends out a signal indicative of the magnetic head 75 position, which signal can initiate the next function. For example, if the end-of-stripe photocell 96 is interrupted, the carriage 76 is returned to the beginning-of-stripe position. The ramp cam surface 88 is located in the vicinity of the beginning-of-stripe position of the magnetic head 75, which is retracted away from the head-in-contact position on the magnetic stripe 25. The cam surface 88 extends horizontally a distance which keeps the magnetic head 75 away from the passbook 20 until the head 75 has moved to a position beyond the end extremity of the patch 25 on the passbook 20 nearest the beginning-of-stripe position, so that it doesn't engage the relatively abrasive passbook document 20 itself, but only contacts the smooth surface of the patch 25. The movement of the magnetic head 75 down onto the magnetic stripe 25 also prevents the movement of the head 75 from dislodging the magnetic stripe 25 itself, which might happen, for example, if the passbook 20 became wrinkled and the patch slightly elevated, which might catch on the head as it moves across. By providing a retractable head 75 as in the present invention, the magnetic head 75 does not move across or contact the ends of the patch 25, which provides a safeguard from the inadvertent peeling or dislodging of the patch 25 by the magnetic head 75. Furthermore, the magnetic head 75 is retracted after performing its function so as not to interfere with further operations of the apparatus.

As will best be seen in FIG. 3, the document guide means or chute 40 is provided with a magnetic head aperture 42 to accommodate the movement of the magnetic head 75 along the magnetic patch 25 when the passbook 20 is positioned properly in the passbook holder 46. Mounted on the document guide means 40 are a plurality of vertically extending pivotal fingers 44 which help to guide the passbook 20 into the document holder 46 and prevent the passbook 20 from hanging up on the lower edge of the magnetic head aperture 42 or the platen 50 as it is being inserted into the passbook holder 46. The vertically extending fingers 44 are easily pivoted so that the movement of the head 75 is not restricted. The movement of the head 75 pivots each of the fingers 44 out of the way as the head moves in either direction along magnetic head aperture 42.

Figure 7:
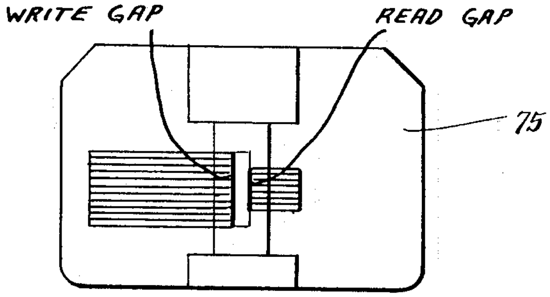
FIG. 7 is a cross-sectional view of a magnetic scanner head which may be used in the present invention.

Another feature of the magnetic head 75 is shown in FIG. 7. The write gap and the read gap have different lengths. The write gap is considerably larger than the read gap, for example 0.120 inch for the write gap compared with 0.042 inch for the read gap. This provides the magnetic system of the teller terminals 10 with tolerence with respect to the alignment of the passbook 20 with the magnetic heads 75 when the passbooks 20 are inserted in different machines than the one in which the magnetic stripe 25 was first written upon. Accordingly, the magnetic stripe passbooks may be interchanged in a large number of different teller terminals 10.

In accordance with one of the concepts of the present invention, the document 20 to be printed upon is moved to the proper position before the printing operation takes place. This concept requires the passbook or document 20 to be clamped in the passbook holder or carrier 46, and the passbook holder 46 along with the clamped passbook 20 is moved together to the selected line to be printed. This movement is achieved by a stepper motor 100. As will best be seen in FIGS. 3 and 5, line stepper motor 100, having a manual knob 102 thereon slip-clutched to a drive shaft 104, drives a pully 106 having a belt drive 110 attached thereto and driven over idler pulleys 108. The belt drive 110 is coupled to the passbook holder 46 by mount 109. A bearing block 114, which is attached to the document holder 46, rides on a document guide shaft 112 which functions to guide the passbook holder 46 with the passbook 20 or document clamped therein as it traverses up and down on the guide shaft 112. In order to select the lines which are to be printed upon, a series of light sources of low persistence, such as light-emitting diodes (LEDs) 120, are provided, mounted on a circuit board 116 and adapted to be sensed by a photosensor 130, such as a phototransistor (e.g. Clairex Electronics part No. LT2160), which is mounted on the passbook holder 46. An extra light source in the form of an LED 118 is provided to indicate or position the passbook holder 46 in the home position in which the passbook 20 is inserted in the holder 46 and the initial magnetic reading is made. The remainder of the LEDs 120 are spaced for each line to be printed upon in the passbook 20, with a space 122 provided to accommodate the centerfold 22 of the passbook 20. Limit switches 128 and 126 are also provided, which are activated in accordance with the movement of the document holder 46 to limit the excursion of the passbook holder 46 with switch 128 preventing upward movement above that point, and switch 126 preventing movement beyond that point in the downward direction.

The required line is selected by turning on the LED 120 which is associated with the line desired to be printed upon. The stepper motor 100 is then activated to position the passbook holder 46. As the stepper motor 100 is stepped, the photosensor 130 affixed to the passbook holder 46 scans the LEDs 120. Upon the occurrence of a coincidence with the selected LED 120, the motion is stopped. Subsequent lines are selected in the same manner by lighting the associated LED 120 with the required line and driving the stepper motor 100 until the photosensor 130 provides coincidence therewith.

Figure 8:
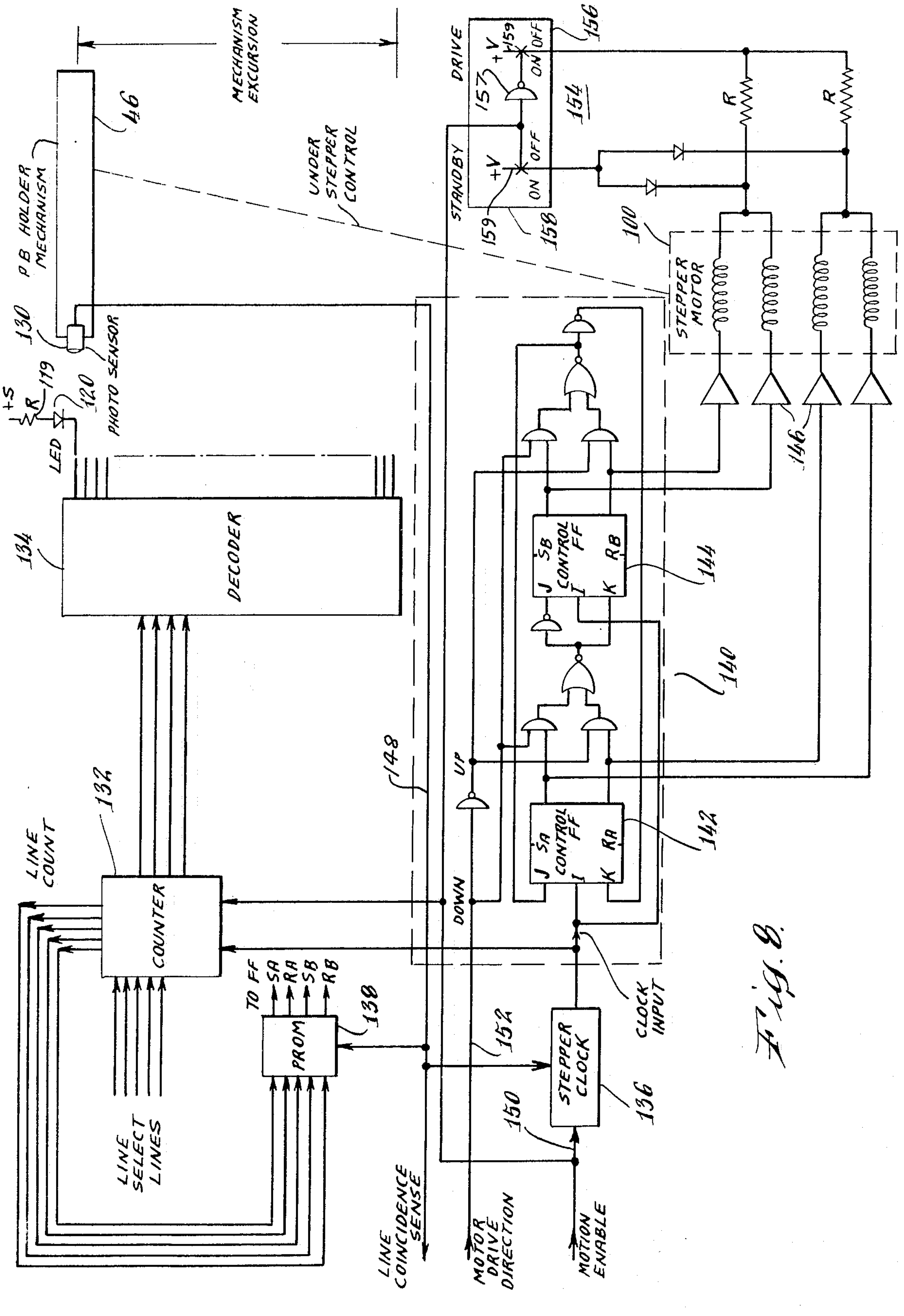
FIG. 8 is an electrical schematic diagram, partly in block form, illustrating the electrical control circuitry utilized in accurately positioning the document for printing thereon in accordance with the present invention.
Figure 9:
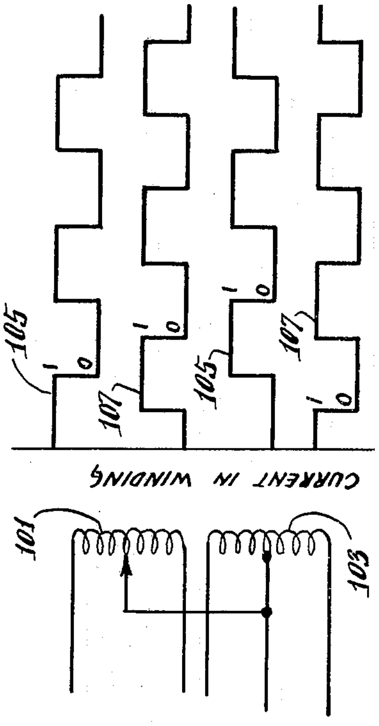
FIG. 9 shows the windings and the waveforms of the sequence of phase currents applied to the windings of the stepper motor utilized in the document-position control circuitry of FIG. 8.

FIG. 8 illustrates the document positioning control circuitry including one form of motor control circuit suitable to be utilized in the present invention. Line select information is loaded into a counter 132 which is in the form of a 5-bit binary code which is fed to a decoder 134 for translating the binary code into a 1 of 32 sequence for selecting the desired line which lights the associated LED 120. This is simply done by applying a voltage through a resistor 119 and through the LED, which is grounded on the other side. The circuit includes a stepper clock 136, a conventional motor control circuit 140 having flipflops 142 and 144 therein, a stepper motor 100 having two pairs of windings 101 and 103, a plurality of amplifiers 146 at the outputs of the flipflops 142 and 144 feeding the windings 101 and 103 of the stepper motor 100, and a power source 154 comprising a full drive source 156 and a standby source 158, either of which may be switched to an off position. Although various types of stepper motors and stepper motor control circuitry may be utilized, for purposes of disclosure the stepper motor 100 is illustrated as a two-phase stepper motor having four windings, two illustrated as windings 101 and two illustrated as windings 103, which are driven two at a time. FIG. 9 illustrates the connection of the windings 101 and 103, driven by the waveforms 105 and 107 which are alternately generated by the flipflops 142 and 144 of the stepper motor control circuit 140. The current 105 in the top winding 101 generates a north pole in the stator associated with the top winding 101, while the current in the lower winding 101 generates a south pole. Likewise, the currents 107 generate north and south poles in the stator for the other windings 103. All four combinations of current in the two windings are generated and given rise to four motor steps. The pattern repeats every fourth steps. Logic for these steps, of course, is generated by the flipflops 142 and 144 of the motor control circuit 140. Both the motor control circuit 140 and the stepper motor 100, operated with a unipolar two-phase drive, are conventional. The motor control circuit 140 has 200 steps per revolution, with 1.8° per step.

The operation of FIG. 8 for the normal (automatic) mode is to load the selected line into the counter 132, which of course provides a binary coded input to the counter 132 containing the information with respect to the line that is to be printed upon. This information is fed to the decoder 134 which activates the LED 120 associated with the line which has been selected. Since the starting position of the passbook holder 46 is in the home position, lines 150 and 152 are enabled, starting the stepper clock 136, switching the power unit 154 to full drive voltage, and the passbook holder 46 is driven downward. When the photosensor 130 on the passbook holder 46 comes upon a lit LED 120, referred to as coincidence, motion is stopped by turning off the stepper clock 136 via line 148, at which time the memory 138, which is called a program-read-only memory (PROM) control, is enabled. The PROM 138 acts as a vernier, or fine tuner, for the line positioning mechanism, and has in its memory the phase relationship of each winding for a given line. The PROM 138, whose output is fed to the set-reset inputs of flipflops 142 and 144, forces the flipflops 142 and 144 into the proper state for the proper line. Subsequent lines are selected in the same sequence, which is: light the LED 120 for the line desired; drive the passbook holder 46 to the lit LED 120, stop at the proper LED 120 by stopping the stepper clock 136 and the stepper motor 100, and lock into the proper step selected for the given line using the PROM 138.

Figure 10:
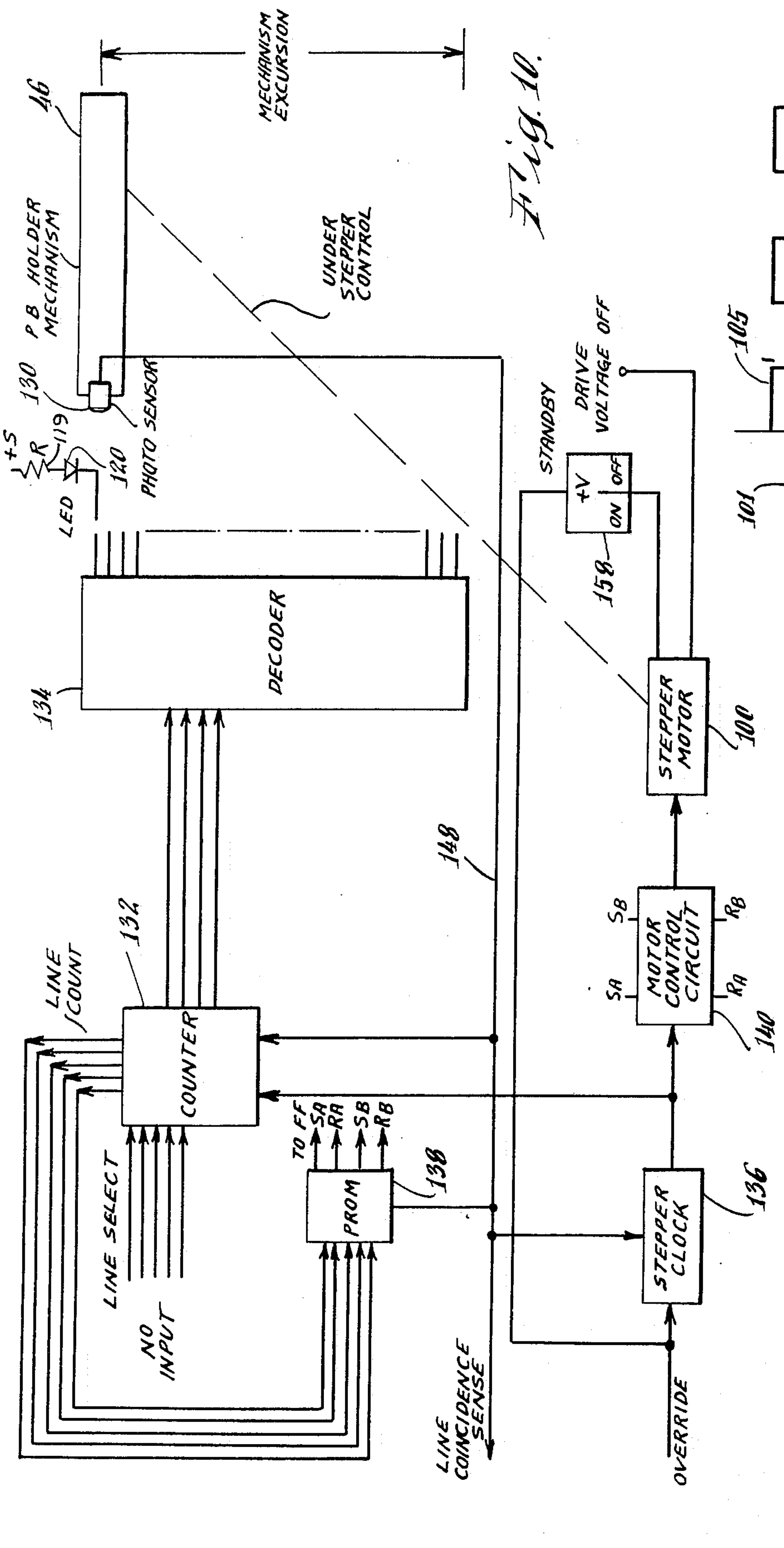
FIG. 10 is an electrical block diagram used to illustrate the operation of the circuitry of FIG. 8 when the system is operated in the override (manual) mode.

To simplify the understanding of the operation of FIG. 8 in the override (manual) mode, FIG. 8 is modified in FIG. 10 to illustrate the operation of the system in the override mode. In the override mode, the passbook holder or mechanism 46 is manually moved to the desired print line by the knob 102, slip clutched to the stepper motor shaft 104. In this mode, the LEDs 120 are cycled on sequentially at approximately a 1-khz rate by clock pulses from clock 136. When the photosensor 130 associated with the moving passbook holder 46 detects a lit LED 120, the cycling action is stopped, with only the detected LED 120 remaining on, and the control voltage to the stepper motor 100 windings 101 and 103 is switched from zero to some lower standby source 158, e.g. 5 volts vs 24 volts for full drive. As the passbook holder 46 is moved, an "electrical detent" action is thus achieved.

Line coincidence controls the detent switching action. When off coincidence, the counter 132 controlling the decoder 134, which in turn controls the LEDs 120, is cycled by the clock 136. Clock pulses are also fed from stepper clock 136 to the motor control flipflops 142 and 144 of motor control circuit 140 and power to the motor windings 101 and 103 is kept off. At line coincidence the cycling action is stopped, the clock 136 output to the control flipflops 142 and 144 is turned off, and the motor windings 101 and 103 are switched to standby power. To insure that the stepper motor 100 locks into the proper step at coincidence, the PROM 138 takes the line count stored in the counter 132 and forces the motor control flip-flops 142 and 144 to the proper state. The line information stored in the counter 132 is also fed back to the system for subsequent automatic control.

By using the document positioning apparatus described above, LEDs 120 provide a coarse alignment of the proper line, and the PROM 138 provides a vernier control to ensure that the document 20 is lined up in accordance with the line selected for printing thereon. Accurate step pulse counts are not required to accurately position the mechanism with the aforesaid control. Furthermore, the positioning device is reversible, and if manual intervention is required or deemed desirable, the control logic can be set up so that the LEDs 120 are continuously cycled as the passbook holder 46 is manually positioned. At coincidence, the counter 132 controlling the cycling is stopped and the LED 120 associated with the selected line is kept on. Furthermore, in the stand-by power mode utilized in the manual operation, the PROM 138 operates on the selected line to provide an electrical detent action when the selected line is reached in accordance with the manual mode of operation. The information which is stored in the counter 132 when the desired manual line is reached is available for feedback to the system so that automatic operation can be resumed. Manual operation may be found desirable when new accounts or other unusual entries must be made or controlled.

The power unit 154 may be in any suitable form to provide standby or full drive voltage. As diagrammatically illustrated in FIG. 8 in the automatic mode, when the standby voltage is on, the drive voltage is off, and vice versa, indicated by an inverter 157. The control may be provided by 159 which are controlled by motion-enable signals from the motion control logic 164. The switches 159 are shown diagrammatically for ease of illustration and may be of any suitable type, for example, transistor switches. In the override mode, the power to the motor windings 101 and 103 is switched from off to standby at coincidence.

Figure 11:
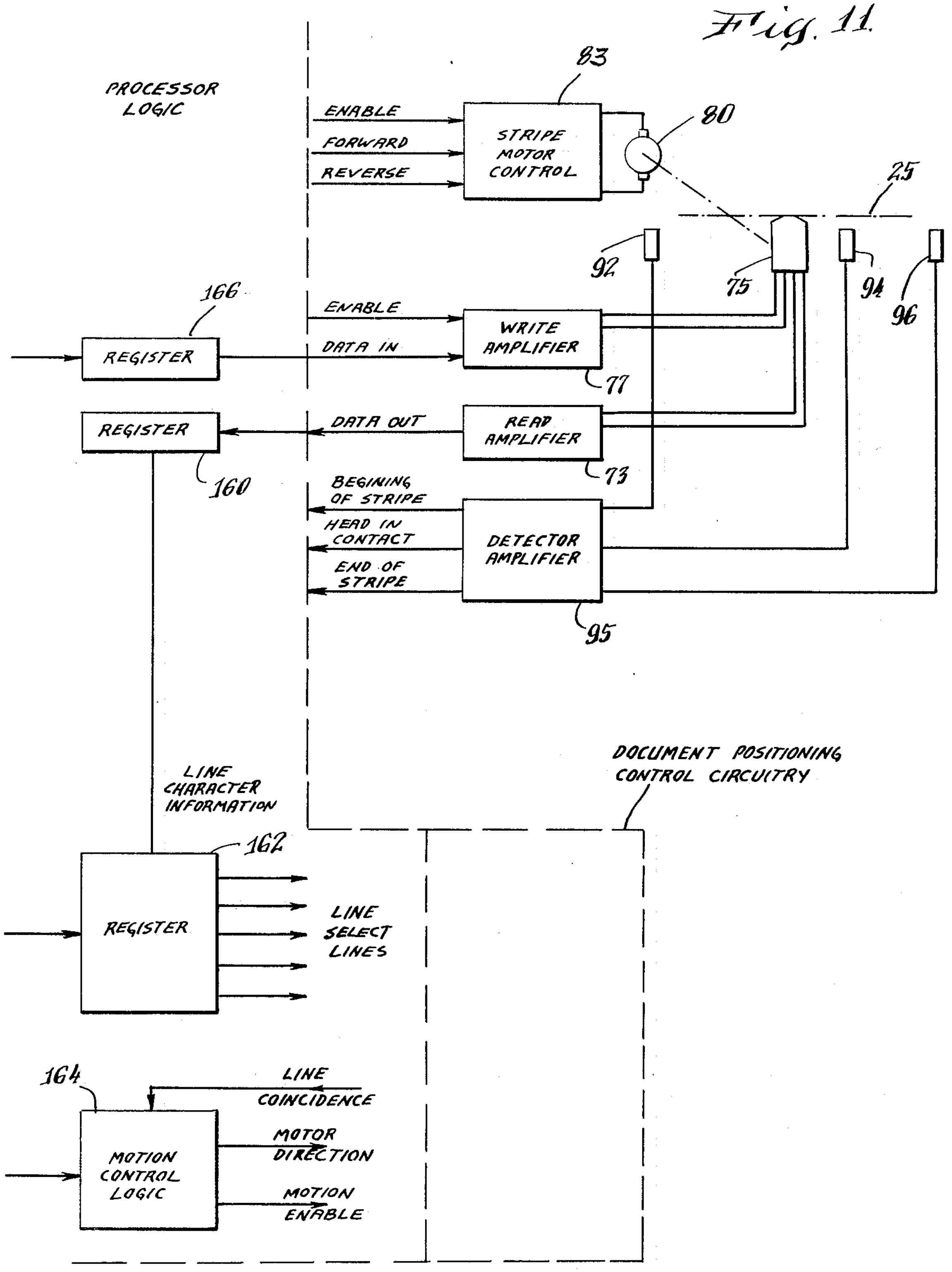
FIG. 11 is a block diagram of the scanner circuits.

FIG. 11 illustrates the magnetic stripe scanner circuitry in block form. The read/write head 75 is driven by motor 80 under the control of stripe motor control circuit 83. The stripe motor control circuit 83 has enable, forward, and reverse inputs which are actuated by the processor logic. The magnetic head 75 has coupled thereto a write amplifier 77 and a read amplifier 73 which are coupled to the processor logic. The position photocells 92, 94, and 96 are coupled to a position detector amplifier 95 which is coupled to the processor logic, and are used in the processor logic for control purposes.

In operation, the stripe motor control circuit 81 "enable" and "forward" inputs are actuated pursuant to signals from the processor logic which activates scanner motor 80 driving head 75 across the stripe 25. Data for the stripe 25 is fed to the read amplifier 73 from which data out is loaded into a register 160 in the processor logic. Line character information is taken from the register 160 and loaded in a register 162 which, on command of the processor, provides line select data to the counter 132 of FIG. 8. The passbook holder 46 is then enabled by actuation of a motion control logic 164 in the processor logic to position the document 20 on the selected line which has been read from the stripe 25. When coincidence is reached, line-coincidence signals are fed back to the motion control logic 164 to terminate motion-enable signals therefrom. On multiple line prints, the processor increments the line select register 162 by one, which lights the next LED 120 corresponding to the next line to be printed on, driving the stepper motor 100 to coincidence, and the process continues.

After the print operation is performed on the selected line, the data on the magnetic stripe 25 may be updated to be used in subsequent printing operations. Data with respect to the new balance and next line to be printed upon is stored in the processor logic in a register 166 and on command may be applied to the data terminal of write amplifier 77 which is enabled along with the motor 80 for driving the head 75 across the stripe 25 to update the indicia on the stripe 25.

Having described the various parts of the document printing apparatus embodied in this invention incorporating a magnetic read/write assembly, a generalized operational sequence will be described, it being understood that the particular sequence described can be altered in accordance with the desires of the operator or teller. The bank teller initiates a transaction by inserting the passbook 20 into the holder 46 in the home position at the document print station 12. The operator then provides instructions to a central processor or computer via a keyboard which is not illustrated, which causes the platen 50 to advance after the passbook 20 is locked in the holder 46 by action of the solenoid clamp 55. The platen 50 clamps and flattens out the passbook 20 just below the magnetic patch 25 for straightening and flattening the magnetic patch 25. The carriage 76 carrying the magnetic head 75 moves right and advances the magnetic head 75 which contacts the magnetic patch 25 on the passbook 20 and reads the data on the patch 25, such as the old balance, account number, and print line to be printed. When the head 75 interrupts photocell 96, the assembly then moves left and retracts the magnetic head 75 to the beginning-of-stripe position. The platen 50 then retracts to an inactuated position and the passbook 20 is automatically positioned to the proper print line by the stepper motor 100. The selected line, which information was extracted from the magnetic patch 25, is fed to the counter 132 which lights up the proper LED 120 corresponding to the line desired to be printed upon. Passbook holder 46 carrying the passbook 20 is driven by the stepper motor 100 until the photosensor 130 registers coincidence with the LED 120 associated with the line to be printed upon is reached, at which time the stepper motor 100 is shut off and the PROM 138 activated to lock in the stepper motor 100 at the proper line. Platen 50 is then advanced against the passbook 20 to smooth out the line which is to be printed upon, the data is printed by the operation of the print head 15. Platen 50 is then deactuated and the passbook holder 46 containing the passbook 20 returned to the home position provided by LED 118. Platen 50 is then advanced and the write gap of the magnetic head 75 is actuated, and moves to the right to update the information on the magnetic patch 25, providing a new balance, the account number, and the next line to be printed upon. The read/write magnetic head 75 then moves left and returns to the beginning-of-stripe position. The platen 50 is then retracted to its deactuated position and the passbook solenoid clamp 55 is released and the passbook 20 removed.

Once the passbook 20 has been inserted in the passbook holder 46 and the system activated, the aforesaid steps may be automatically completed without operator intervention. The system flexibility, however, offers the alternative of manual intervention as desired. Accordingly, the system can be run automatically, manually, or a combination of automatic and manual in accordance with the desires of the operator.

It will be apparent that various aspects of the invention are not restricted in use in a magnetic stripe passbook printing operation of the type shown and described as a bank teller terminal 10. For example, the document positioning mechanism 46 may be utilized in a number of different types of printing applications. It will also be apparent that several other features of the present invention may be utilized in different applications.

By providing a magnetic strip capability to a document printing arrangement, the intelligence written on the stripe 25 may be utilized in the automatic printing process, and can be updated after that process is completed so that in subsequent operations the updated data may be used to initiate the next print operation at a later time.

For purposes of disclosure the stripe 25 on the document 20 has been described as being magnetic, which is the preferred form. However, the benefits of this invention may be realized using stripes of other forms of medium which are capable of having indicia or information recorded upon and/or read by a suitable transducer which is compatible with the readable and recordable medium. The stripe or medium may also be an integral part of the document to be printed upon. It will also be apparent that the indicia or information on the medium may be in coded form.

Certain aspects of the present invention are related to facilitating the reading and/or writing of indicia on a stripe 25 as well as printing upon documents 20 containing such indicia, which documents 20 may be subject to abuse. Such documents tend to become bent, wrinkled, etc., due to repeated handling by the user. The present invention is capable of handling such documents. For example, the stripe 25 is positioned on the document 20 such that when inserted in the print station 12, the stripe 25 is smoothed by the clamping action of the platen 50 to facilitate reading and/or writing thereon. Furthermore, the scanning assembly 71 is provided with a spring-loaded transducer or head 75 to accommodate further variations in the surface of the stripe 25 containing the indicia. the spring-loaded transducer 75 also accommodates variations in the thickness of the documents. The platen 50 is provided with compensation means 52 to accommodate various thicknesses of documents in the print operation (see application Ser. No. 433,096). Since the platen 50 contacts the back of the document 20 containing the stripe 25 and positions the document 20 in the same print plane regardless of document thickness, the distance between the stripe 25 and the scanner head 75 thus also varies with the thickness of document. Accordingly, the spring-loaded scanner head 75 is provided to accommodate this difference in spacing caused by variations in document thickness.

It should be pointed out that the terminology chosen for purposes of disclosure with respect to the position of the scanner head 75 as a beginning-of-stripe position does not mean that the head 75 is required to be located at the beginning of the stripe 25 when it is retracted therefrom. The beginning-of-stripe position is used in the context of a start, rest, or home position in which the head 75 is retracted from the stripe 25 and at rest. In this position the head 75 may be positioned beyond the left extremity of the stripe 25 if desired. In the same context, end-of-stripe position of the head 75 need not occur at the very end of the stripe 25. All that is necessary is that the end-of-stripe position occurs at some point at or beyond the end of the indicia which is to be written and/or read on the stripe 25. Accordingly, the positions may vary to fit the operating requirements of the system in which the structure is used.

Different forms of drive means and the associated control means therefor may be utilized for providing controlled movement of the document holder 46. It will also be appreciated that the data stored in the memory (PROM) 138 would be varied in accordance with the type of drive means and control means employed. The function of the PROM 138 is to store data which will properly condition the control means for supplying a predetermined drive signal to the drive means in order to properly position the document holder 46 on any desired predetermined line. Accordingly, changes in the drive means and the control means coupled thereto may require the use of different data in the memory for each line desired to be printed upon to insure the locking in of the document holder 46 on the proper line after coincidence occurs, as has been previously discussed.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:

1. A document positioning means for a printing apparatus having a print element which prints on a document positioned adjacent thereto comprising a. a document holder for receiving a document to be printed on positioned therein and transported thereby, b. drive means coupled to said document holder for providing controlled movement of said document holder containing said document and positioning different lines of the document to be printed upon adjacent the print element, c. at least one light sensor type element, d. at least one light source type element, e. a plurality of one type of said elements being in alignment and spaced such that at least one of said one type of elements is provided for each line to be printed on said document, said at least one light sensor type element and said at least one light source type element being positioned for relative movement with respect to each other in accordance with the relative movement between said document holder and said print element, one of the other type of said elements scanning said plurality of said one type of said elements when said document holder is driven by said drive means, f. means for selectively illuminating said one type of said elements for identifying the line on the document to be printed, and g. control means coupled to said drive means for supplying drive signals to said drive means for moving said document holder, h. said control means stopping said drive means when said other type element is in light communication with an activated element, thereby positioning said document adjacent said print element so that a print operation can be performed on the selected line.

2. The document positioning means as set forth in claim 1 wherein said one type element is a light source element, and said other type element is a light sensor element.

3. The document positioning means set forth in claim 2 including memory means having data stored therein for properly conditioning said control means to supply predetermined signals to said drive means for properly positioning said document holder for each line to be printed on said document, said memory means being enabled and coupled to said control means when said light sensor detects a lit light source for providing the proper drive signals for said drive means by said control means to insure that said document holder is in the correct position for the selected line.

4. The document positioning means set forth in claim 3 wherein said drive means is manually operated and said means for selectively illuminating said light sources continuously cycles said light sources until coincidence occurs between a lit light source and said light sensor, and means for applying standby power to said drive means when said memory means is enabled on coincidence between a lit light source and said light sensor for providing an electrical detent action to the movement of said document holder when coincidence occurs.

5. The document positioning means set forth in claim 2 wherein said drive means is manually operated and said means for selectively illuminating said light sources continuously cycles said light sources until coincidence occurs between a lit light source and said light sensor, and means for applying an electrical detent action to the movement of said document holder during said coincidence of said light sensor with a lit light source.

6. The document positioning means set forth in claim 1 wherein said drive means comprises a stepper motor and said control means comprises a stepper motor control circuit.

7. The document positioning means set forth in claim 6 wherein said stepper motor has four windings and said motor control circuit includes a pair of flipflop circuits which are each coupled to a pair of said windings for driving said windings and stepping said stepper motor.

8. The document positioning means set forth in claim 7 wherein said one type element is a light source element and said other type element is a light sensor element, including a memory means coupled to said flipflop circuits of said motor control circuit, said memory means having data stored therein for properly conditioning said flipflop circuits to provide the proper drive signals to said windings of said stepper motor for correctly positioning said document holder for each line to be printed upon said document, and means for enabling said memory means on the coincidence between a lit light source and said light sensor for conditioning said flipflop circuits to provide the proper drive signals to said windings to insure that said document is properly positioned adjacent said print element so that a print operation can be performed on the selected line.

9. The document positioning means set forth in claim 7 wherein said one type element is a light source element and said other type element is a light sensor element and said stepper motor has a drive shaft coupled to said document positioning means, a knob clutched to said drive shaft of said stepper motor for manually driving said document positioning means by rotating said knob, clock means for continually cycling said light sources, means for disabling said clock means on coincidence between a lit light source of said light sensor, and means for applying signals to said windings of said stepper motor on coincidence to provide an electrical detent action on the manual operation of said knob.

10. The document positioning means set forth in Claim 1 wherein said one type element is a light source element, and said other type element is a light sensor element.

11. The document positioning means as set forth in Claim 1 wherein said one type element is a light sensor element and said other type element is a light source element.

12. A document positioning means for a printing apparatus having a print element which prints on a document positioned adjacent thereto comprising a. a document holder for receiving a document to be printed on positioned therein and transported thereby, b. a print element for performing print operations on said document, c. drive means coupled to said document holder for providing controlled movement of said document holder containing said document and positioning different lines of the document to be printed upon adjacent the print element, d. a light sensor and a plurality of light sources in alignment and spaced such that at least one light source is provided for each line to be printed on said document, said light sensor and said plurality of light sources being positioned for relative movement with respect to each other in accordance with the relative movement between said document holder and said print element, said light sensor scanning said light sources when said document holder is driven by said drive means, and e. means for selectively illuminating said light sources for identifying the line on the document to be printed, f. control means coupled to said drive means for supplying drive signals to said drive means for moving said document holder, g. said control means being responsive to said light sensor for stopping said drive means when said light sensor detects light from an illuminated light source thereby positioning said document adjacent said print element so that a print operation can be performed on the selected line.

13. The document positioning means set forth in claim 12 including memory means having data stored therein for properly conditioning said control means to supply predetermined signals to said drive means for properly positioning said document holder for each line to be printed on said document, said memory means being enabled and coupled to said control means when said light sensor detects a lit light source for providing the proper drive signals for said drive means by said control means to insure that said document holder is in the correct position for the selected line.

14. The document positioning means set forth in claim 13 wherein said drive means is manually operated and said means for selectively illuminating said light sources continuously cycles said light sources until coincidence occurs between a lit light source and said light sensor, and means for applying standby power to said drive means when said memory means is enabled on coincidence between a lit light source and said light sensor for providing an electrical detent action to the movement of said document holder when coincidence occurs.

* * * * *